United States Patent

[11] 3,539,058

| [72] | Inventor | Robert G. Ferris |
| | | Harvard, Illinois |
| [21] | Appl. No. | 739,084 |
| [22] | Filed | June 21, 1968 |
| [45] | Patented | Nov. 10, 1970 |
| [73] | Assignee | Starline, Inc. |
| | | a corporation of Delaware |

[54] SILO UNLOADER WITH CONTINUOUSLY VARIABLE LOAD RESPONSIVE DRIVE CONTROL
8 Claims, 6 Drawing Figs.

[52] U.S. Cl. .................................................. 214/17,
318/77, 318/334
[51] Int. Cl. ........................................................ B65g 65/46
[50] Field of Search ........................................... 214/17.82,
17.84; 318/71, 77, 334

[56] References Cited
UNITED STATES PATENTS
| 2,614,238 | 10/1952 | Alexander | 318/334X |
| 3,204,786 | 9/1965 | Kucera | 214/17(.84)X |
| 3,217,907 | 11/1965 | Buschbom | 214/17(.84)X |
| 3,298,543 | 1/1967 | Laidig | 214/17(.82)X |
| 3,308,973 | 3/1967 | Heitzman | 214/17(.84)X |
| 3,384,801 | 5/1968 | Rodgers | 318/334 |

OTHER REFERENCES
"Machine Design" Jan. 5, 1967 pp. 118—123., A. A. Adem "Controlling Universal Motor Speed"

Primary Examiner—Robert G. Sheridan
Attorney—Hofgren, Wegner, Allen, Stellman & McCord ABSTRACT: A control for silo unloading mechanisms wherein a first electric motor rotates a material gathering and conveying means and a second electric motor advances the material gathering and conveying means into the material, with continuously variable means being provided to control the rate at which the second electric motor advances the material gathering and conveying means. The control includes thermally responsive means in the form of a heater connected in circuit with the first electric motor and a bimetallic element operatively associated with the heater and the continuously variable means for varying the speed of the second electric motor in response to varying loads on the first electric motor.

Patented Nov. 10, 1970

Inventor:
Robert G. Ferris
By Hofgren, Wegner, Allen,
Stellman & McCord
Attorneys 3,539,058

SILO UNLOADER WITH CONTINUOUSLY VARIABLE LOAD RESPONSIVE DRIVE CONTROL

BACKGROUND OF THE INVENTION

Two basic types of unloading mechanisms are utilized to withdraw material from a silo; the first being a top unloading mechanism which rides over the top of the material in the silo and conveys the material externally thereof, and the second being a bottom unloading mechanism which rides beneath the material in the silo and conveys the material externally thereof. One type of top unloading mechanism is suspended within a silo by a cable that is connected to a winch structure, so that the unloading mechanism can be gradually lowered into the silo as the material is conveyed therefrom. The top unloader structure conventionally includes a material gathering and conveying means, such as an auger conveyor, which rotates about the axis of the silo, with the auger functioning to convey the material toward the center of the silo where an impeller structure forces the material along a discharge chute to a zone external of the silo. A single motor is usually provided for both rotating the auger about its own axis, and for rotating the auger about the axis of the silo, with appropriate power takeoff means being provided to accomplish the dual driving function; although in certain instances it has been proposed to provide separate prime movers for rotating the auger about its own axis, and for rotating the auger about the axis of the silo. The winch mechanism for lowering the top unloading structure into the silo has been conventionally operated through a suitable crank mechanism, although in certain instances electric motor means has been provided for lowering the top unloading structure within the silo.

In bottom unloading structures, a material gathering and conveying means, such as an auger, is conventionally mounted for rotation about the silo axis; and an opening is usually provided in the center of the silo floor, so that material conveyed radially inwardly by the rotating auger will pass downwardly through the opening where a further transfer means is provided for conveying material externally of the silo. In bottom unloading mechanisms, it is conventional to provide a first prime mover for rotating the auger about its own axis, and a second prime mover for rotating the auger about the axis of the silo.

As is explained in Laidig U.S. Pat. No. 3,298,543, when bottom silo unloaders of the above described type are operated, it is possible that the cutting knives associated with the auger will bring down more material than the auger can handle efficiently, thus causing the auger to operate more slowly and eventually stall if the overload is not relieved. In like manner with a top unloader it is possible for the unloader to be lowered too quickly by the winch mechanism, so that the auger will be overloaded and eventually stall.

The above mentioned Laidig patent discloses a control means for obviating the overloading problem previously encountered in bottom unloaders; and the control means disclosed therein interrupts rotation of the sweep arm when the load on the auger exceeds a predetermined level, and then automatically permits resumption of rotation of the sweep arm when the auger load drops below a predetermined level. In one embodiment disclosed in the above mentioned Laidig patent, a completely on-off system is provided, wherein the sweep arm motor is deenergized when the auger motor is overloaded and remains deenergized until the load on the auger motor is reduced to the preselected level. In another embodiment described in the above mentioned Laidig patent, a multispeed motor is provided for the sweep arm, so that the sweep arm may rotate at three different speeds, or stop, depending on the load upon the auger motor.

While the arrangements described in the above mentioned Laidig patent have generally functioned satisfactorily, they do not provide a means whereby the speed of the auger motor could be continuously or universally varied in response to changing loads on the auger motor.

SUMMARY OF THE INVENTION

The present invention relates to a control means for both top and bottom silo unloaders, wherein continuously variable means is provided to control the rate at which an electric motor advances a material gathering and conveying means into the material in a silo in response to changes in loads upon a first electric motor that rotates a material gathering and conveying means. In one embodiment of the present invention, the continuously variable means is manually adjustable by an operator who visually observes the changes in load upon the electric motor that rotates the material gathering and conveying means; while in a second embodiment of the invention, the continuously variable means is operatively responsive to changes in loads upon the electric motor that rotates the material gathering and conveying means. The preferred embodiments of the invention utilize a silicon controlled rectifier as the continuously variable means, and in an exemplary form of the invention, thermally responsive means senses the loading on the motor for rotating the material gathering and conveying means, with a bimetallic element being operatively associated with the thermally responsive means to adjust the silicon controlled rectifier and control the speed of the motor for either rotating the sweep arm in a bottom unloader, or lowering the unloader within the silo in a top unloader.

DESCRIPTION OF THE PREFERRED EMBODIMENTS

Figure 1:
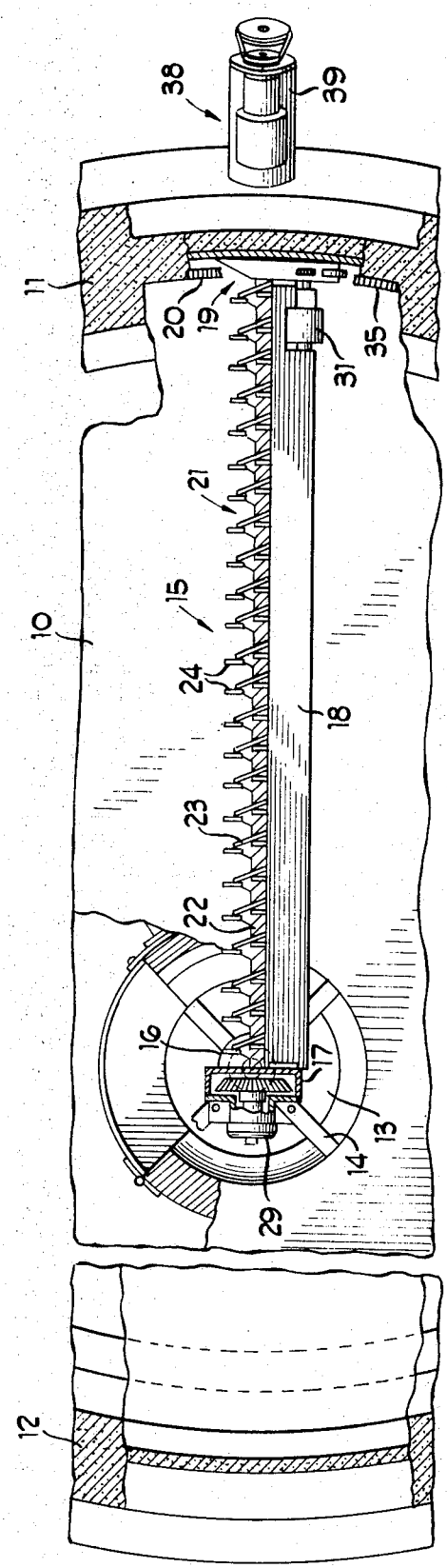
FIG. 1 is a fragmentary horizontal sectional view through a silo having a bottom unloading mechanism therein, with which the control means of the present invention is utilized.

While this invention is susceptible of embodiment in many different forms, there is shown in the drawings and will herein be described in detail only preferred embodiments with the understanding that the present disclosure is to be considered as an exemplification of the principles of the invention and is not intended to limit the invention to the embodiments illustrated.

Figure 2:
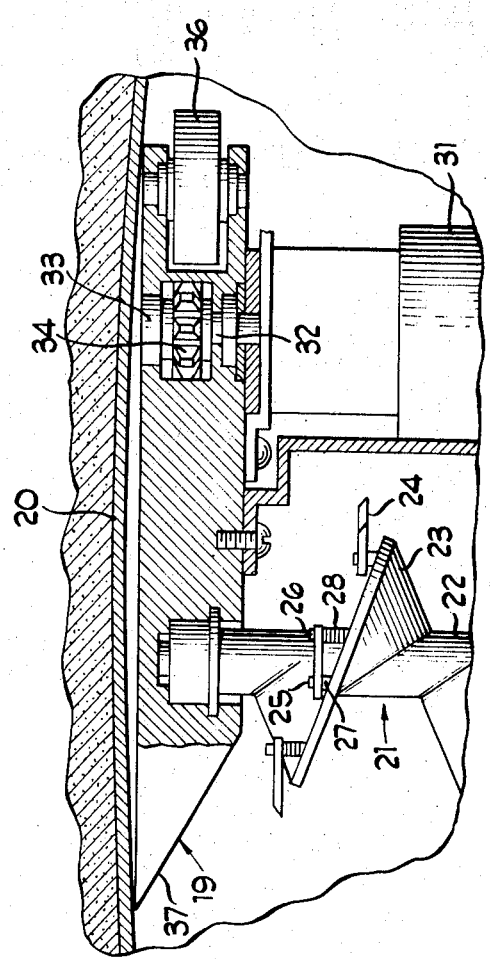
FIG. 2 is a fragmentary section on an enlarged scale at the outer extremity of the sweep arm.

Referring to FIGS. 1 and 2, which illustrate a bottom unloader structure, a silo has a floor 10, the periphery of which is supported on a cylindrical foundation wall 11 from which a cylindrical silo wall 12 extends upwardly. An axial opening 13 in the floor of the silo is provided with a spider 14 upon which a sweep arm, indicated generally at 15, is mounted for rotation by means of a bearing head 16.

Surmounting the bearing head 16 is a housing 17 to which the inner end of an arcuate shield 18 is secured. The outer end of the shield 18 is secured to a drive plow, indicated generally at 19, which is illustrated as riding in a channel member 20 which is recessed in the silo wall 12, but which may, if desired, be positioned wholly inside the silo wall so the plow rides on the floor 10. A helical auger conveyor, indicated generally at 21, includes a shaft 22 which has its inner and outer ends journaled, respectively, in the housing 17 and the drive plow 19, and a helical auger flight 23 on the shaft is provided with peripherally mounted knives 24 that provide cutting means.

Drive means for the conveyor 21 includes a first electric motor 29 that is supported on the spider 14 and is drivingly connected with the auger shaft 22 by gear means, part of which is journaled in the bearing head 16 and part of which is in the housing 17.

The sweep arm 15 has an electric motor 31 near its outer end that has an output shaft 32 journaled in a bearing 33 in the drive plow 19, and a pinion 34 in the form of a sprocket makes positive driving engagement with a rack 35 which takes the form of a roller chain fixedly mounted in the upper web of the channel member 20. A supporting wheel 36 is journaled in the rear of the drive plow to support the plow, and the front end of the plow is provided with a surface 37 which is diagonal to the wall 12 so as to move silage inwardly toward the sweep auger 21. The motor 29 provides first drive means for driving the conveyor auger 21 with its associated cutting blades 24, while the motor 31 and sprocket 34 provides second drive means for rotating the sweep arm 15 about the silo.

Silage moved to the central opening 13 by the auger conveyor 21 drops into the inner end (not shown) of separate discharge auger means, indicated generally at 38, the outer end 39 of which extends through the silo foundation 11 so as to discharge material outside the silo. Conveniently, the conveyor 38 is also a helical type conveyor.

Figure 3:
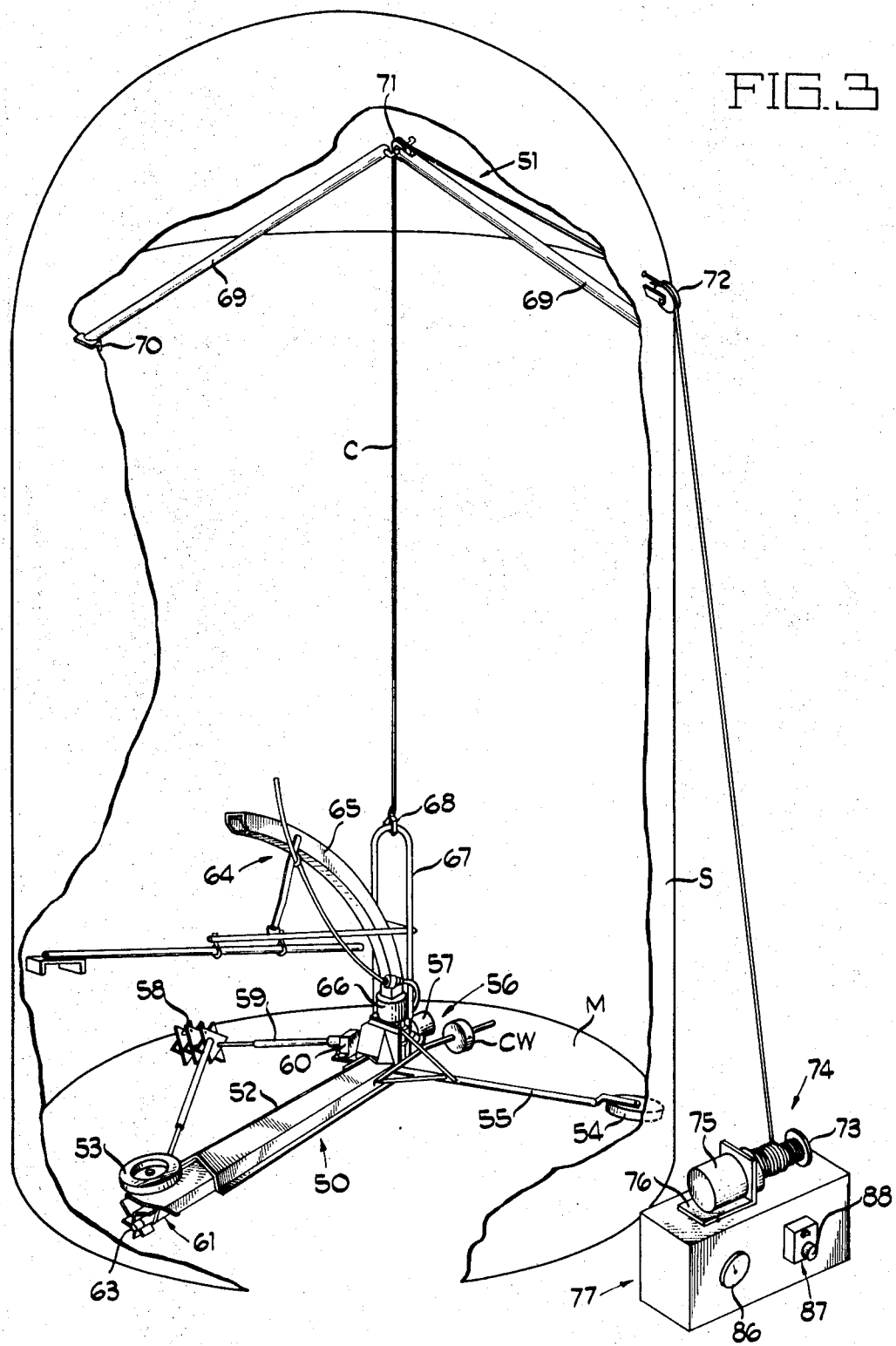
FIG. 3 is a perspective view, with portions of a silo broken away, and illustrating a top unloading mechanism with which the control means of the present invention is utilized.

Referring now to FIG. 3, a top unloader is illustrated in its entirety at 50, and unloader 50 is suspended within a silo S by a suspension system 51, so as to be disposed upon the top of the material M within the silo. Unloader 50 may be of the type disclosed in the copending application Ser. No. 609,901 filed Jan. 17, 1967, in the name of Loren P. Boppart, and assigned to the assignee of the present application which issued June 17, 1969 as U.S. Pat. No. 3,450,277. The disclosure of said patent is hereby incorporated by reference into the present application, and reference may be had thereto for structural features not described in detail herein.

Unloader 50 includes a sweep arm 52 that is adapted to extend radially of silo S. A first guide wheel 53 is provided at the outer end of sweep arm 52, and a second guide wheel 54 is carried by an arm 55 that extends laterally outwardly from sweep arm 52; and guide wheels 53 and 54 are adapted to bear against the inner surface of the wall of silo S to guide the sweep arm as it is rotated about the silo. Unloader 50 is provided with a counterweight CW on the side thereof opposite sweep arm 52 to balance the unloader during rotation of the sweep arm.

Power means 56 is provided at the inner end of sweep arm 52, and in one embodiment, the power means includes a single motor 57 carried by a bracket mounted on the innermost portion of the sweep arm. A propelling wheel 58, which is adapted to drivingly engage the upper surface of the material within the silo, is carried at the outer end of an extensible drive tube 59; and drive tube 59 is connected to motor 57 through a speed reducer and suitable drive means within housing 60.

A material gathering and conveying means is provided on sweep arm 52 for gathering material and conveying the same radially inwardly of the silo S as the sweep arm 52 rotates thereabout, and said means takes the form of an auger conveyor 61 mounted for rotation with respect to sweep arm 52. Auger conveyor 61 is supported at its outer end by a bearing suspended from sweep arm 52, and is supported adjacent its inner end by a bearing also suspended from the sweep arm 52. Auger conveyor 61 is rotated by chain and sprocket means (not shown) connected with the output shaft of motor 57. Cutters (not shown) such as knives or the like may be secured to the auger flighting for loosening material as the sweep arm rotates about the silo, and a cutter assembly 63 is preferably provided adjacent the outer end of the auger shaft for cutting through the relatively dense material adjacent the wall of silo S. While a single motor 57 has been illustrated and described for both rotating the sweep arm 52 and the auger 61, it will become evident from the ensuing description that separate motors may be provided for each of these functions, as in the previously described bottom unloader structure. When a separate motor is provided for rotating the sweep arm 52, as in the system illustrated in FIG. 6 it may be positioned within the housing 60.

Material discharging means 64 is provided at the inner end of sweep arm 52 and includes a chute 65, which extends upwardly from a collector ring 66 at the inner end of the sweep arm 52 and which projects toward an opening in the silo wall. Impeller means, not shown, at the inner end of sweep arm 52 directs material collected by the auger 61 into the chute 65 for discharge from the silo.

Suspension means 51 includes an inverted U-shaped arch member 67 secured to the inner end of sweep arm 52, and having a cable mounting stirrup 68 at the upper end. Suspension means 51 further includes a tripod assembly in the top of the silo S, including three outwardly extending legs 69 secured to the silo wall as by brackets 70. A pulley 71 is rotatably secured centrally of the tripod legs 69, and a cable C is trained over the pulley 71 so as to extend downwardly where it is secured to the stirrup 68 on arch 67. Cable C extends generally radially outwardly from pulley 71, where it is trained over a second pulley 72 associated with one of the mounting brackets 70 for a tripod leg 69. Cable C extends downwardly from pulley 72 where it is wrapped around the drum 73 of a winch assembly 74. Drum 73 is rotated by a motor 75 that is secured to the side of silo S by bracket 76; and winch assembly 74 functions to lower the unloader 50 into engagement with the material M when it is desired to discharge material from the silo, and to raise the unloader from engagement with the material M during periods of nonuse. A motor control assembly 77 is preferably also mounted on the silo S adjacent winch assembly 74.

From the foregoing it will be appreciated that the motors 29 and 57 for the bottom unloader and top unloader, respectively, perform an analogous function, i.e. to rotate a material gathering and conveying means to transfer material into a position where discharging means may operate on the material to transfer it externally of a silo. Motors 31 and 75 for the bottom unloader and top unloader, respectively, also perform an analogous function, i.e. to advance the material gathering and conveying means into material transferring association with the material in the silo.

Figure 4:
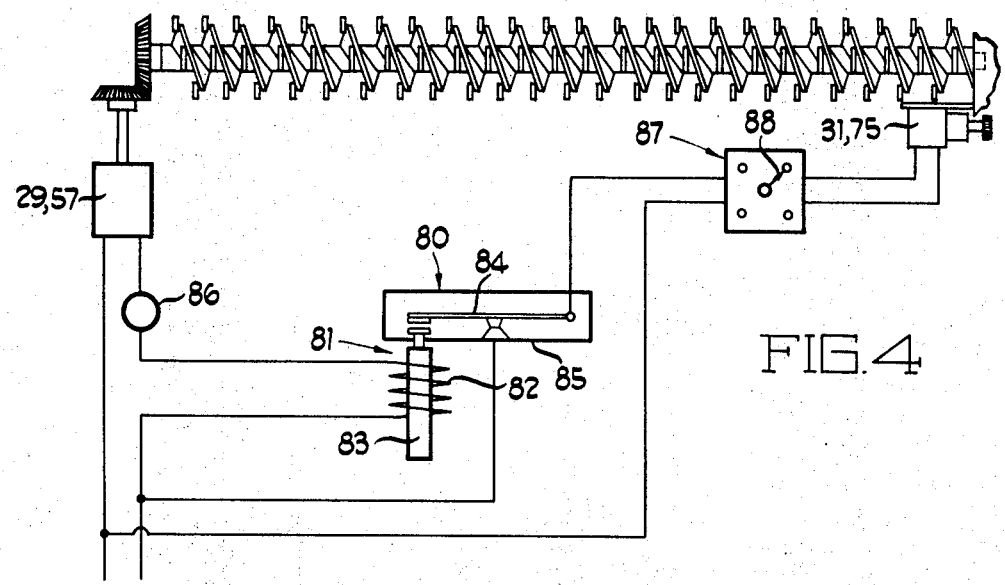
FIG. 4 is a diagrammatic view of one embodiment of the control means of the present invention.

Referring now to FIG. 4, a first embodiment of a load responsive control is illustrated, which may be used in either of the previously described top and bottom unloaders. The control means of FIG. 4 is similar to one of the embodiments illustrated in the above mentioned Laidig patent to the extent that it includes solenoid switch means, indicated generally at 80, having a solenoid 81 with a coil 82 and a plunger 83, with the coil 82 being wired in series with the first drive motor 29 or 57. As illustrated, the plunger is urged by gravity to a normal position and when the load on the motor 29 or 57 reaches a predetermined level the current through the coil 82 moves the plunger 83 upwardly into contact with an arm 84 of a normally closed switch 85 so as to open the circuit to the motor 31 or 75 and suspend drive of said latter motor until the load on the first drive motor is again below the predetermined level. When this occurs, the second drive motor 31 or 75 resumes either rotating the sweep arm or lowering the unloading structure.

Continuously variable means is provided for controlling the speed of drive motor 31 or 75, and herein the continuously variable means takes the form of a silicon controlled rectifier SCR 87 connected across motor 31 or 75 and having a manually adjustable control 88. The SCR 87 is utilized as a voltage regulating device which controls the speed of motor 31 or 75 by controlling the voltage impressed thereacross. A suitable circuit, not shown, may be provided for controlling the SCR 87, and such a circuit typically includes a charging capacitor and a variable resistor. By adjusting the variable resistor, the time at which SCR 87 fires and hence the average voltage across the motor 31 or 75, and thus its speed, can be regulated. A suitable SCR unit is sold by Lutron Electronics, Inc., as its Mark II Speedial; and comparable units are sold by General Electric, Westinghouse, and others.

In the embodiment of FIG. 4, an ammeter 86 is preferably connected in the circuit to the first drive motor 29 or 57, so as to be indicative of the load on the first drive motor. In use, the operator visually observes the ammeter 86 to determine whether or not the first drive motor 29 or 57 is being overloaded, and if so, the SCR unit 87 is adjusted by manually rotating control 88 to reduce the speed of the second drive motor 31 or 75 until the overload is overcome, as is indicated by ammeter 86. In the arrangement of FIG. 4, the solenoid switch 80 provides an on–off safety arrangement that prevents overloading of the first drive motor 29 or 57 by completely stopping the second drive motor 31 or 75, if for example the operator is not in position to observe the ammeter 86 as the first drive motor 29 or 57 is overloaded. It will be appreciated that the safety means provided by the solenoid switch means 80 is not essential to control of the speed of the second drive motor 31 or 75, and in certain instances the solenoid switch means 80 may be eliminated, so that the control of the second drive motors 31 and 75 is effected by merely visually observing ammeter 86 and adjusting the SCR unit 87. In the latter arrangement, overloading of the primary motor 29 or 57 is prevented by thermal overload switches conventionally provided with such motors.

Figure 5:
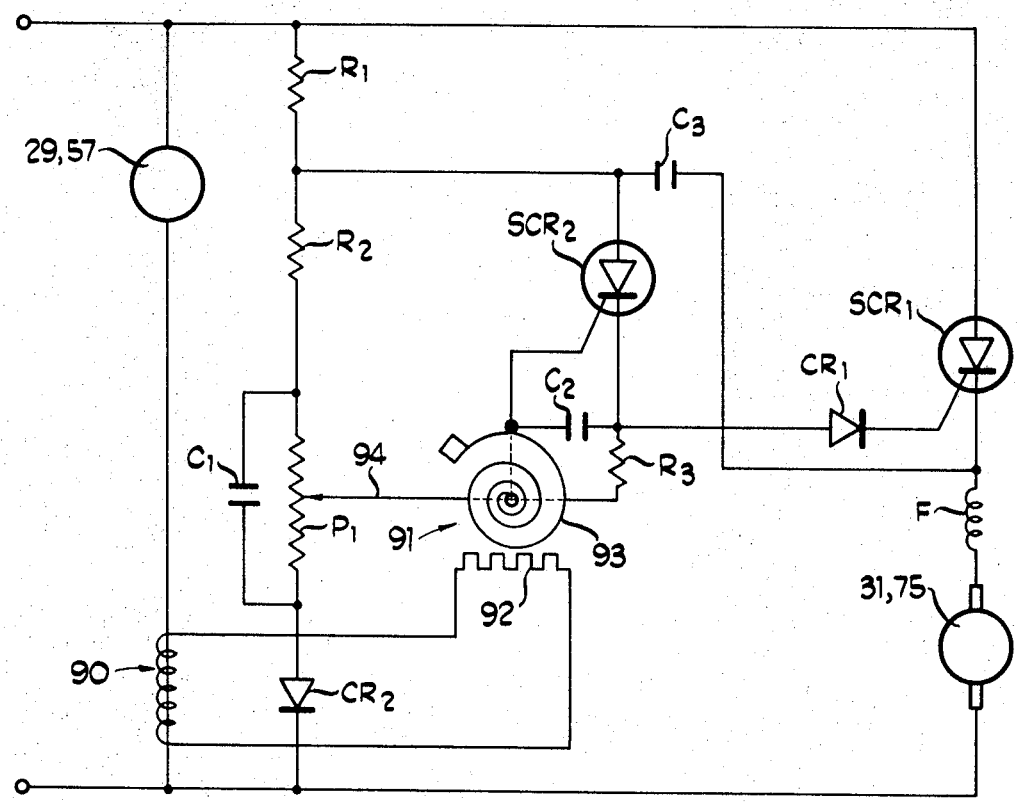
FIG. 5 is a diagrammatic view of a second embodiment of the control means of the present invention.

Referring now to FIG 5, a further embodiment of the control means is illustrated wherein the speed of the second drive motor 31 or 75 is automatically controlled in response to changes in load upon the first drive motor 29 or 57. In the embodiment of FIG. 5, the coil of a current transformer 90 is operatively associated with a line to the first drive motor 29 or 57, so as to be indicative of the load thereon, and thermally responsive means 91 is connected in circuit with current transformer 90 for controlling the speed of second drive motor 31 or 75. The thermally responsive means includes a heater 92 connected in circuit with the coil of current transformer 90, and positioned in operative heating association with a spirally wound bimetallic element 93. The bimetallic element 93 functions to adjust the control 94 of a variable resistance P1 in response to changing loads on the first drive motor 29 or 57. The series network, including resistors R1, R2, P1 and diode CR2, provides an adjustable reference voltage from the arm of resistor P1 to the gate of SCR 1. Capacitor C1, charging up to a positive voltage when the input voltage swings positive, discharges through variable resistor P1 producing a positive signal at the gate of SCR 2. This signal is greater than the voltage at the cathode of SCR 2, since resistor R3 presents a voltage drop between the two terminals of SCR 2. SCR 2 essentially acts as an amplifier stage between the reference voltage and the gate of SCR 1, and the positive pulse produced at the gate of SCR 2 fires SCR 2, current flowing through this branch during the positive input half cycle since the anode of SCR 2 is positive. This current fires SCR 1 almost instantaneously when the small forward voltage drop of diode CR1 is exceeded. Firing of SCR 1 produces current through that element to the second drive motor 31 or 75, accelerating the motor. As the motor approaches a preset speed, the residual induced voltage in the armature builds up, and once the motor reaches operating speed, the residual induced voltage provides automatic speed regulating action. Variable resistor P1 adjusts the desired motor speed by controlling the rate of change of voltage at arm 94 in response to changes in load upon the first drive motor 29 or 57. Capacitor C2 in parallel with resistor R3 also assists in smoothing out the positive voltage triggering SCR 2. When capacitor C1 discharges, capacitor C2 developes a voltage across it, positive at the gate of SCR 2, and maintains this positive voltage while the input voltage swings negative. Therefore, the voltage applied to SCR 2 is more linear, and it is possible to obtain a uniform control of motor speed by adjusting variable resistor P1, since there is almost a one-to-one correspondence from applied voltage to motor speed.

Diodes CR1 and CR2 are preferably of the A14B type; while SCR 1 is either of the C22B or C32B type, and SCR 2 is of the C106F type. In an illustrative embodiment, the resistors and capacitors have the following values:

$R_1$—33k.Ω

$R_2$—10k.Ω

$R_3$—1k.Ω

$P_1$—7.5k.Ω

$C_1$—1μf.

$C_2$—0.1μf.

$C_3$—0.02μf.

Figure 6:
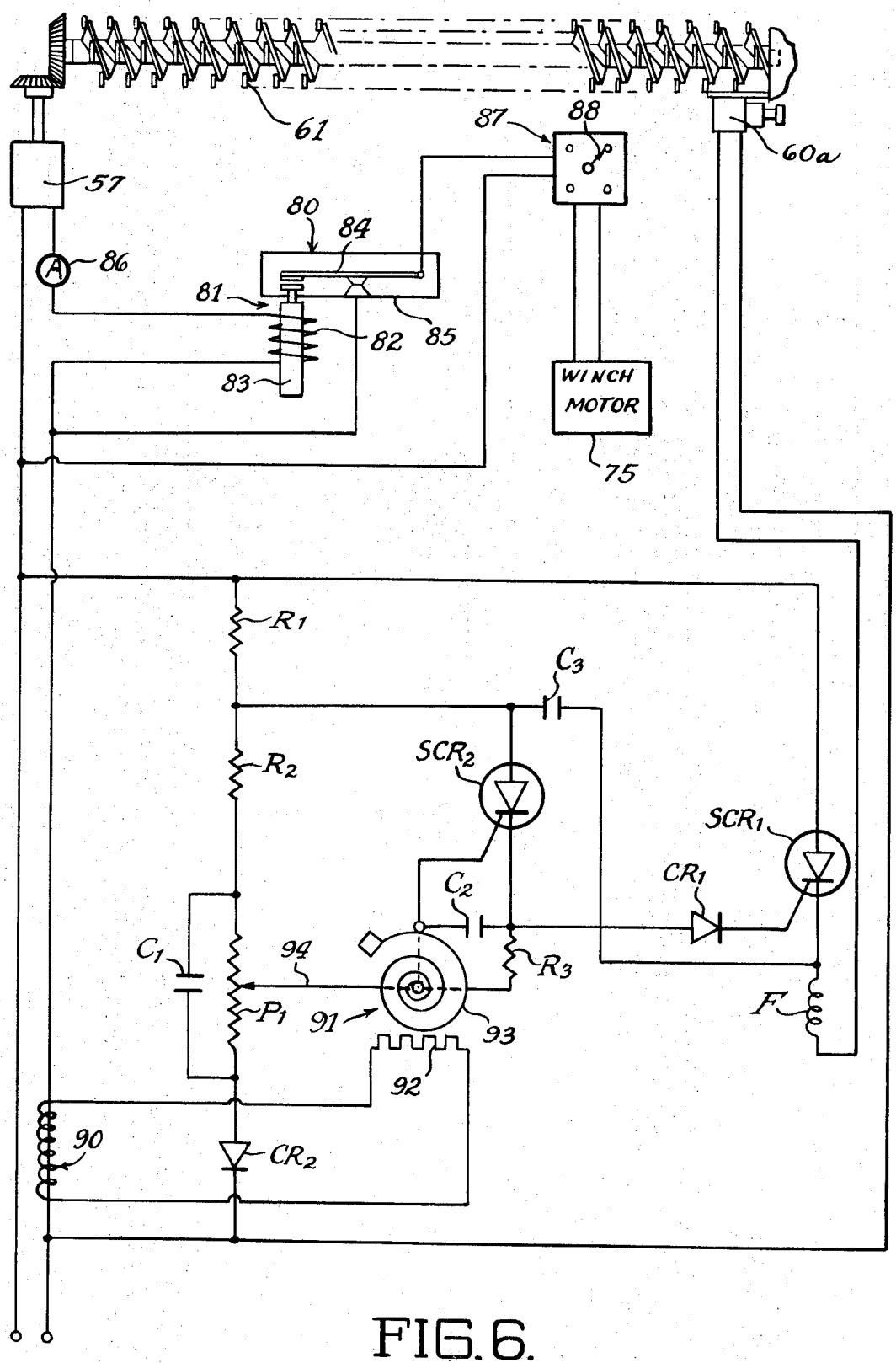
FIG. 6 is a diagrammatic view of a control circuit for a top unloader having separate drive motors for rotating the auger about its axis and about the axis of the silo, and a third motor for controlling the winch which lowers the unloader.

Referring now to FIG. 6, motor 57 rotates only the auger 61, and a separate motor 60a is provided in housing 60 for rotating the sweep arm 52. The motor 60a is made operatively responsive to the triggering SCR 1 (FIG. 5) so that the speed of this motor is operatively responsive to, and inversely proportionate with, the load upon the auger motor 57. In this modified top unloader version, an ammeter 86 is connected in the circuit to the auger motor 57 so as to be indicative of the load thereon, and a manually adjustable SCR unit 87 is connected in circuit with the winch motor 75, so that the speed of the winch motor can be manually, yet universally controlled. In this arrangement, the rotational speed of the sweep arm is automatically modulated in response to changing loads upon the auger motor 57 so as to keep the motor 57 under its optimum load, while the SCR unit 87 controls the winch motor 75 so as to lower the unloader at a rate that would keep an optimum amount of feed or a selected amount of feed delivered.

I claim:

1. A silo unloader comprising:
    a generally radially extending sweep arm;
    means mounting said sweep arm for rotation about the axis of the silo;
    material cutting and conveying means on said sweep arm for severing and moving material to a discharge location adjacent the axis of the silo;
    means for moving material from said discharge location out of the silo;
    first electric motor means for driving said material cutting and conveying means;
    second electric motor means for advancing said sweep arm to bring the cutting and conveying means into operative material transferring association with the material in the silo; and
    continuously variable means for controlling the rate at which said second electric motor means rotates said sweep arm, said continuously variable means including a continuously controllable conduction device, a source of electric energy, means connecting said controllable device between said source and said second electric motor means, sensing means operatively responsive to loading of said first electric motor means for producing a sensing signal continuously proportional thereto, and control means connected between said sensing means and said controllable device for controlling conduction of said device in proportion to said sensing signal.

2. The silo unloader of claim 1 wherein said continuously controllable conduction device comprises a gateable conduction device for passing electric energy when gated into a conduction state by a triggering signal at a control electrode, and said control means is responsive to said sensing signal for varying the time of generation of a triggering signal coupled to said control electrode.

3. The silo unloader of claim 2 wherein said source comprises a source of AC energy, said device passing portions of said AC energy when gated into said conduction state, and said control means includes capacitor means and unidirectional conduction means connecting said capacitor means to said AC source.

4. A silo unloader as set forth in claim 1 wherein said sensing means includes heater means connected in circuit with said first electric motor means, and a bimetallic element in operative association with said heater means, said bimetallic element being operatively connected to said continuously variable device for actuation thereof.

5. A silo unloader as set forth in claim 1 in which said material gathering and conveying means is mounted for rotation at the bottom of a silo beneath the material therein, and wherein said second electric motor means rotates said material gathering and conveying means about the axis of said silo.

6. A silo unloader as set forth in claim 1 in which said material gathering and conveying means is suspended to rotate on the top of the material within the silo, and wherein the second electric motor means lowers said material gathering and conveying means into engagement with the material in the silo.

7. A silo unloader as set forth in claim 1 in which said material gathering and conveying means is suspended to rotate on the top of the material within the silo; and wherein said continuously variable means includes first and second continuously variable devices, and said second electric motor means includes a first motor for lowering said material gathering and conveying means into engagement with the material in the silo and a second motor for rotating said material gathering and conveying means about the axis of the silo, said first continuously variable device being connected to said first motor for control thereof and said second continuously variable device being connected to said second motor for control thereof.

8. A silo unloader as set forth in claim 7 wherein said first continuously variable device is manually controllable and said second continuously variable device is operatively responsive to loading on said first electric motor means.